United States Patent
Albano et al.

(10) Patent No.: US 10,031,593 B2
(45) Date of Patent: *Jul. 24, 2018

(54) SPHERE-LIKE INPUT DEVICE

(75) Inventors: Gherardo Albano, Rome (IT);
Francesco M. De Collibus, Milan (IT);
Luca Landi, Rome (IT); Claudio Prudenzi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 954 days.

This patent is subject to a terminal disclaimer.

(21) Appl. No.: 13/328,112

(22) Filed: Dec. 16, 2011

(65) Prior Publication Data
US 2012/0154267 A1    Jun. 21, 2012

(30) Foreign Application Priority Data
Dec. 16, 2010 (EP) ..................... 10195297

(51) Int. Cl.
*G06F 3/038* (2013.01)
*G06F 3/01* (2006.01)
*G06F 3/0346* (2013.01)

(52) U.S. Cl.
CPC ............ *G06F 3/038* (2013.01); *G06F 3/017* (2013.01); *G06F 3/0346* (2013.01); *G06F 2203/0384* (2013.01)

(58) Field of Classification Search
CPC ........ G06F 3/038; G06F 3/017; G06F 3/0346; G06F 2203/0384
See application file for complete search history.

(56) References Cited

U.S. PATENT DOCUMENTS

| 4,839,838 A | 6/1989 | Labiche et al. |
| 5,541,621 A * | 7/1996 | Nmngani ............ 345/167 |

(Continued)

FOREIGN PATENT DOCUMENTS

| JP | 1028720 A | 1/1989 |
| WO | 97/39401 A1 | 10/1997 |

(Continued)

OTHER PUBLICATIONS

International Search Report and Written Opinion received for PCT Application No. PCT/EP2011/07851, dated Mar. 20, 2012, 15 pages.

(Continued)

*Primary Examiner* — Amr Awad
*Assistant Examiner* — Andre Matthews
(74) *Attorney, Agent, or Firm* — Jordan IP Law, LLC

(57) ABSTRACT

Embodiments of the invention provide a human interface device including an inner sphere, wherein the inner sphere has a center point. The human interface device can further include an outer sphere, and the outer sphere may be compressible. The human interface device may also include a plurality of pressure sensors between the inner sphere and the outer sphere for detecting localized compression of the outer sphere, a first three-axis-accelerometer located within the inner sphere, and a second three-axis-accelerometer located within the inner sphere, wherein the first three-axis-accelerometer and the second three-axis-accelerometer-accelerometer are each located at least a predetermined distance from the center point.

11 Claims, 5 Drawing Sheets

(56) References Cited

U.S. PATENT DOCUMENTS

| | | | |
|---|---|---|---|
| 5,923,318 A * | 7/1999 | Zhai et al. | 345/157 |
| 6,072,467 A * | 6/2000 | Walker | 345/157 |
| 8,441,434 B2 * | 5/2013 | Vaananen et al. | 345/156 |
| 2007/0247439 A1 | 10/2007 | Daniel et al. | |
| 2008/0174550 A1 | 7/2008 | Kari et al. | |
| 2008/0291165 A1 | 11/2008 | Fe Dahlin | |
| 2009/0022503 A1 | 9/2009 | Vaananen et al. | |
| 2009/0225030 A1 | 9/2009 | Vaananen et al. | |

FOREIGN PATENT DOCUMENTS

| | | |
|---|---|---|
| WO | 00/63874 A1 | 10/2000 |
| WO | 2007/077124 A1 | 7/2007 |

OTHER PUBLICATIONS

Jin et al., "A Novel Multimedia Input Device: The Electro-Sphere", CREU Project Proposal, 2007.
Toto, "Puyocon: Ball-shaped, squeezable input interface", Jan. 12, 2010, CrunchGear Blog, TechCrunch.
Non-Final Office Action for U.S. Appl. No. 13/415,293, dated Aug. 19, 2013, 11 pages, U.S. Patent and Trademark Office.
Final Office Action for U.S. Appl. No. 13/415,293, dated Nov. 9, 2017, 21 pages.
Office Action for U.S. Appl. No. 13/328,112, dated Jan. 23, 2017, 23 pages.
Office Action for U.S. Appl. No. 13/415,293, dated Jan. 20, 2017, 19 pages.
Notice of Allowance for U.S. Appl. No. 13/415,293, dated Mar. 14, 2018, 13 pages.

* cited by examiner

SPHERE-LIKE INPUT DEVICE

BACKGROUND

Embodiments of the invention generally relate to human interface devices, and in particular to a sphere shaped human interface device.

Human interface devices are generally used to provide information or data to operators and/or receive information or data from operators. A human interface, also known as a user interface, is configured to enable input from an operator to be received by a computer and to provide output from the computer to the user. The main function of a user interface is thus to allow an operator to control or manipulate a computer and the computer to indicate the effects of the operator's control or manipulation. Human interface devices for inputting data to or controlling a computer can take many forms. Keyboards and mice are well known examples. United States Patent Application Publication No. US2009/0225030 describes a spherical shaped pointing device.

BRIEF SUMMARY

Embodiments of the invention provide a human interface device, a computer-readable storage medium, and a computer-implemented method according to the independent claims. Embodiments are given in the dependent claims.

A sphere or ball is a basic and widely spread form that is familiar across the entire world and throughout different cultures. Having a ball shaped or spherical input device, capable of giving input by simple rotations, would be beneficial.

The movement and rotation of a ball can be determined using a gyroscope and an accelerometer. However, accelerometers may be expensive. Embodiments of the invention address this by incorporating two three-axis-accelerometers into the human interface device. The two three-axis-accelerometers are located off axis. This allows the measurement of two acceleration vectors which enable the detection of rotation of the ball and of movement of the ball.

Embodiments of the invention may appear like a normal ball, roughly the size of a palm. In one embodiment to click, it will be enough to push the top of the sphere. To select, you may just lift the ball, avoiding rotational movement, and drag it around.

The applications for a sphere-like input device are wide. The ball is the more basic shape for interaction with, and the more easy to manage, so could be useful as a pointing device for children, even very small children (a baby could easily interact with a ball, like a game), and for impaired people. Even people with no arms could manage a ball with their feet, and even people without any limb may manage a ball with their head, for example. It may also works as an anti-stress gadget, and for entertainment purposes.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network.

'Computer memory' or 'memory' is an example of a computer-readable storage medium. Computer memory is any memory which is directly accessible to a processor. Examples of computer memory include, but are not limited to: RAM memory, registers, and register files.

'Computer storage' or 'storage' is an example of a computer-readable storage medium. Computer storage is any non-volatile computer-readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

A 'computing device' as used herein may encompass any device comprising a processor. A 'processor' as used herein may encompass an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device may also be interpreted to possibly refer to a collection or network of computing devices each comprising a processor or processors. Many programs have their instructions performed by multiple processors that may be within the same computing device or which may even be distributed across multiple computing devices.

A 'user interface' as used herein is an interface which allows a user or operator to interact with a computer or computer system. A 'user interface' may also be referred to as a 'human interface device.' A 'human interface device' which is used to control a computer or input information to a computer may also be referred to as a 'user manipulandum.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

In one aspect the invention provides for a human interface device. The human interface device comprises an inner sphere. The sphere has a center point. The inner sphere may be made of a rigid material or it may be semi-rigid. By being semi-rigid that is to say that the inner sphere may be to a certain degree compressible. The human interface device further comprises an outer sphere. The outer sphere is compressible. The outer sphere may be made of a material that is deformable. The human interface device further comprises a plurality of pressure sensors between the inner sphere and the outer sphere for detecting localized compression of the outer sphere. Pressing on or compressing the outer sphere causes one or several of the plurality of pressure sensors to be activated or switched. The pressure sensors may be on/off switches or they may be pressure sensors which detect the degree or amount of force or pressure exerted on them.

The human interface device further comprises a first three-axis-accelerometer located within the inner sphere. The human interface device further comprises a second three-axis-accelerometer located within the inner sphere. A three-axis-accelerometer as used herein refers to an accelerometer which measures the acceleration in three orthogonal directions. The three-axis-accelerometer may for instance be a MEMS or micro-electrical mechanical systems accelerometer. These are inexpensive accelerometers which have been used extensively for measuring acceleration in the automotive industry. The first three-axis-accelerometer and the second three-axis-accelerometer are located at least a predetermined distance from the center point. This embodiment is advantageous because the two accelerometers are located away from the center point. This means that the two accelerometers may be used for measuring the rotation of the sphere. A single three-axis-accelerometer would not be able to measure rotation of the sphere accurately. However, the combination of the two three-axis-accelerometers allows rotation to be measured. This is advantageous in comparison to the combination of an accelerometer and a gyroscope because the two three-axis-accelerometers are much less expensive than a combination of the three-axis-accelerometer and a gyroscope.

In another embodiment the first three-axis-accelerometer and the second three-axis-accelerometer each have an accelerometer center. The accelerometer center is defined by the intersection of the three axes of a three-axis-accelerometer. A first axis through the accelerometer center of the first three-axis-accelerometer and the center point is orthogonal to a second axis through the accelerometer center of the second three-axis-accelerometer and the center point. The first three-axis-accelerometer and the second first three-axis-accelerometer are both located the predetermined distance from the center point.

In this embodiment both accelerometers are the same distance from the center point. That is to say the accelerometer centers of both the first and second three-axis-accelerometer are located the same distance from the center point. Secondly, both the first and the second three-axis-accelerometer are mounted on orthogonal axes. This is advantageous because a rotation of the inner sphere will cause the same centripetal acceleration within both accelerometers. Additionally the acceleration due to the centripetal force will have the same magnitude.

In another embodiment the human interface device further comprises a memory for storing machine executable instructions. The machine executable instructions may for instance be stored on a computer-readable storage medium. The human interface device further comprises a processor for executing the machine executable instructions. The plurality of pressure sensors generate time-dependent pressure sensor data. The first three-axis-accelerometer and the second three-axis-accelerometer generate time-dependent accelerometer data. Execution of the instructions causes the processor to receive the time-dependent pressure sensor data. Execution of the instructions further causes the processor to receive the time-dependent accelerometer data. Execution of the instructions further causes the processor to determine a control gesture in accordance with the time-dependent pressure sensor data and the time-dependent accelerometer data.

The time-dependent pressure sensor data as used herein refers to data recorded or measured by the plurality of pressure sensors as a function of time. The time-dependent accelerometer data as used herein refers to data acquired by both the first and second three-axis-accelerometer as a function of time. The processor may be a processor that is located within either the inner sphere and/or the outer sphere or it may be a processor located on a remote computer. For instance all data processing could be performed within the spheres or raw data could be sent to a computer system with a processor. The control gesture may in some embodiments be determined by comparing the time-dependent pressure sensor data and/or time-dependent accelerometer data to a library of control gestures. The different gestures could be classified by a variety of parameters. For instance using simple accelerometer data the rotation of the ball could be measured rotating the ball back and forth between two positions could be another gesture. Shaking the ball or moving the ball could also be classified as gestures. Squeezing the ball will cause a certain combination of pressure sensors to be activated. Squeezing the ball in combination with moving and shaking and/or rotating the ball could also be used to form additional gestures. The human interface device could also be thrown or dropped as a gesture.

In another embodiment execution of the instructions further causes the processor to determine a rotation of the human interface device using the time-dependent accelerometer data. The control gesture is at least partially determined by the rotation of the human interface device.

In another embodiment execution of the instructions further causes the processor to determine a first acceleration vector in accordance with the time-dependent accelerometer data. The first acceleration vector represents the acceleration measured by the first three-axis-accelerometer. Execution of the instructions further causes the processor to determine a second acceleration vector in accordance with the time-dependent accelerometer data. The second acceleration vector represents the acceleration measured by the second three-axis-accelerometer.

Execution of the instructions further causes the processor to determine the rotation. The rotation is determined at least partially by subtracting the first acceleration vector from the second acceleration vector. The location of the first three-axis-accelerometer and the second three-axis-accelerometer is known with respect to each other within the inner sphere. The first and second acceleration vectors can be expressed in a common coordinate system. This analysis assumes that the sphere is initially at rest. The human interface device is rotating the accelerometer and centripetal acceleration is neglected. As the sphere is beginning to be rotated the acceleration vectors caused by the rotation will be at right angles to each other. The acceleration caused by non-rotational acceleration of the human interface will be constant for both accelerometers. Therefore subtracting the two will lead to a vector which is representative of the rotation of the human interface device.

In another embodiment execution of the instructions further causes the processor to determine if the magnitude of one of the first acceleration vector or the second acceleration vector is below a predetermined threshold. Execution of the instructions further causes the processor to determine the rotation using the magnitude of the other of the first acceleration vector or the second acceleration vector if the magnitude of the one is below the predetermined threshold. In this case a rotational axis is passing through an accelerometer center of either the first or second three-axis-accelerometer. If the axis of rotation passes through an accelerometer center then the accelerometer will not be able to measure the acceleration.

In another embodiment the rotation is determined as a function of time. The control gesture is at least partially determined by the rotation of the human interface device as a function of time.

In another embodiment execution of the instructions causes the processor to detect a pattern in accordance with the time-dependent pressure sensor data. The control gesture is at least partially determined by the pattern. In this embodiment exerting force on the outer sphere causes a portion of the plurality of pressure sensors to be depressed. A pattern is then recognized and used to form part of the criteria for selecting a control gesture.

In another embodiment execution of the instructions further causes the processor to determine the acceleration of the human interface device using the time-dependent accelerometer data. The control gesture is at least partially determined by the acceleration of the human interface device. The acceleration of the human interface device as used herein refers to the non-rotational acceleration.

In another embodiment execution of the instructions further causes the processor to determine a first acceleration vector in accordance with the time-dependent accelerometer data. The first acceleration vector represents the acceleration measured by the first three-axis-accelerometer. Execution of the instructions further causes the processor to determine a second acceleration vector in accordance with the time-dependent accelerometer data. The second acceleration represents the acceleration measured by the second three-axis-accelerometer. Execution of the instructions further causes the processor to determine a device acceleration vector. The device acceleration vector is determined by constructing the vector from the largest common vector components of the first acceleration vector and the second acceleration vector. The largest common vector components as used herein refers to examining the coordinates of each of the vectors and determining the largest vector component in each coordinate direction. This can be used to construct the device acceleration vector. The device acceleration vector represents the acceleration of the human interface device.

In another embodiment the acceleration is determined as a function of time. The control gesture is at least partially determined by the acceleration of the human interface device as a function of time. For instance, if the device is being shaken the acceleration of the human interface device will change periodically. If the human interface device is being dropped the acceleration will be constant and then will abruptly change after a period of time.

In another embodiment the human interface device comprises a radio communication system for transmitting any one of the following to a computer system: the time-dependent pressure sensor data, the time-dependent accelerometer data, the control gesture, or combinations thereof. This embodiment is advantageous because the control gesture or any combination of the raw data measured by the human interface device needs to be sent to a computer system. The computer system may interpret a gesture or it may use a gesture determined by the human interface device.

In another embodiment the human interface device further comprises a battery for powering the human interface device. The human interface device further comprises an inductive charging system for charging the battery using an inductive charger. This is advantageous because wires or leads are not needed to charge the human interface device. In an alternative embodiment there is a jack or plug to which a power cable can be plugged into the human interface device to charge the battery.

In another aspect the invention provides for a computer-readable storage medium containing machine executable instructions for execution by a processor of a human interface device according to an embodiment of the invention. Execution of the instructions causes the processor to receive the time-dependent pressure sensor data. Execution of the instructions further causes the processor to receive the time-dependent accelerometer data. Execution of the instructions further causes the processor to determine a control gesture in accordance with the time-dependent pressure sensor data and the time-dependent accelerometer data.

In another aspect the invention provides for a computer-implemented method of determining a control gesture for a human interface device according to an embodiment of the invention. The plurality of pressure sensors generates time-dependent pressure sensor data. The first three-axis-accelerometer and the second three-axis-accelerometer generate time-dependent accelerometer data. The method comprises the step of receiving time-dependent pressure sensor data. The method further comprises the step of receiving the time-dependent accelerometer data. The method further comprises the step of determining a control gesture in accordance with the time-dependent pressure sensor data and the time-dependent accelerometer data.

According to an embodiment of the present invention, there is provided an apparatus comprising an inner sphere, wherein the inner sphere has a center point, an outer sphere, wherein the outer sphere is compressible, a plurality of pressure sensors between the inner sphere and the outer sphere for detecting localized compression of the outer sphere, a first three-axis-accelerometer located within the inner sphere, and a second three-axis-accelerometer located within the inner sphere, wherein the first three-axis-accelerometer and the second three-axis-accelerometer-accelerometer are each located at least a predetermined distance from the center point.

According to an embodiment of the present invention, there is provided a computer readable storage medium comprising a set of instructions, which, if executed by a processor, cause a computer to receive time dependent pressure sensor data, receive time dependent accelerometer data, determine a control gesture in accordance with the time dependent pressure sensor data and the time dependent accelerometer data.

According to an embodiment of the present invention, there is provided a method comprising receiving time dependent pressure sensor data, receiving time dependent accelerometer data and determining a control gesture in accordance with the time dependent pressure sensor data and the time dependent accelerometer data.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

A human interface device including an inner sphere and an outer sphere and a method for utilizing a human interface device according to embodiments of the present invention will be described below with reference to the accompanying drawings.

In the following, like numbered elements in these figures are either similar elements or perform an equivalent function. Elements that have been discussed previously will not necessarily be discussed in later figures if the function is equivalent.

Figure 1:
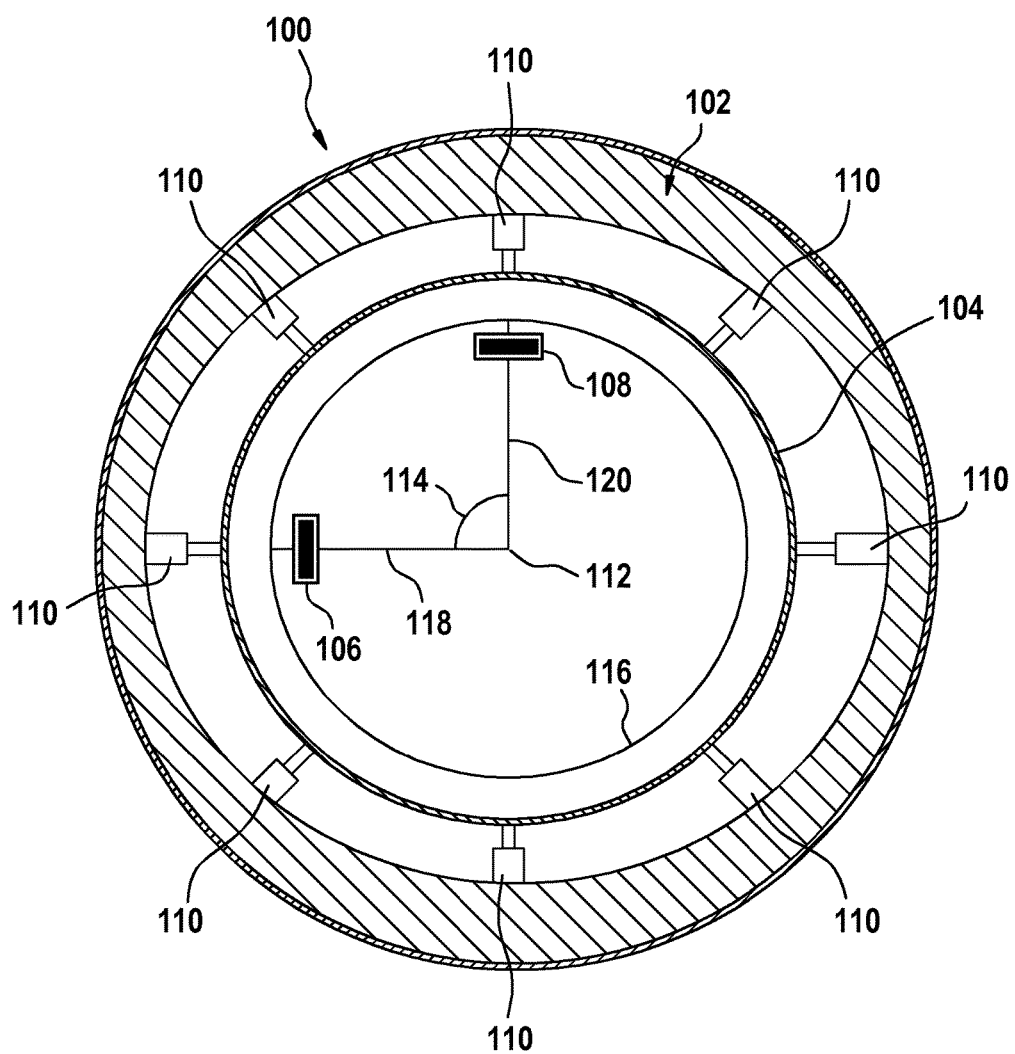
FIG. 1 illustrates a human interface device according to an embodiment of the invention.

FIG. 1 shows an embodiment of the human interface device according to the invention. The human interface device includes an outer sphere 102 which for instance may be coated with foam or with a rubber-covering surface. Within the outer sphere 102 is an inner sphere 104. The inner sphere may be rigid or semi-rigid. Within the inner sphere 104 is a first three-axis-accelerometer 106 and a second three-axis-accelerometer 108. Between the outer sphere 102 and the inner sphere 104 is a plurality or collection of pressure sensors 110. A pressure sensor may measure the amount of pressure or it may simply be an on/off switch.

Within the center of the human interface device is center point 112. There is a first axis 118 passing through the accelerometer center of the first three-axis-accelerometer and the center point 112. There is a second axis 120 passing through the accelerometer center of the second three-axis-accelerometer 108 and the center point 112. The first axis 118 and the second axis form a right angle 114. The first three-axis-accelerometer 108 and the second three-axis-accelerometer 108 are mounted a radius 116 away from the center point 112.

Figure 2:
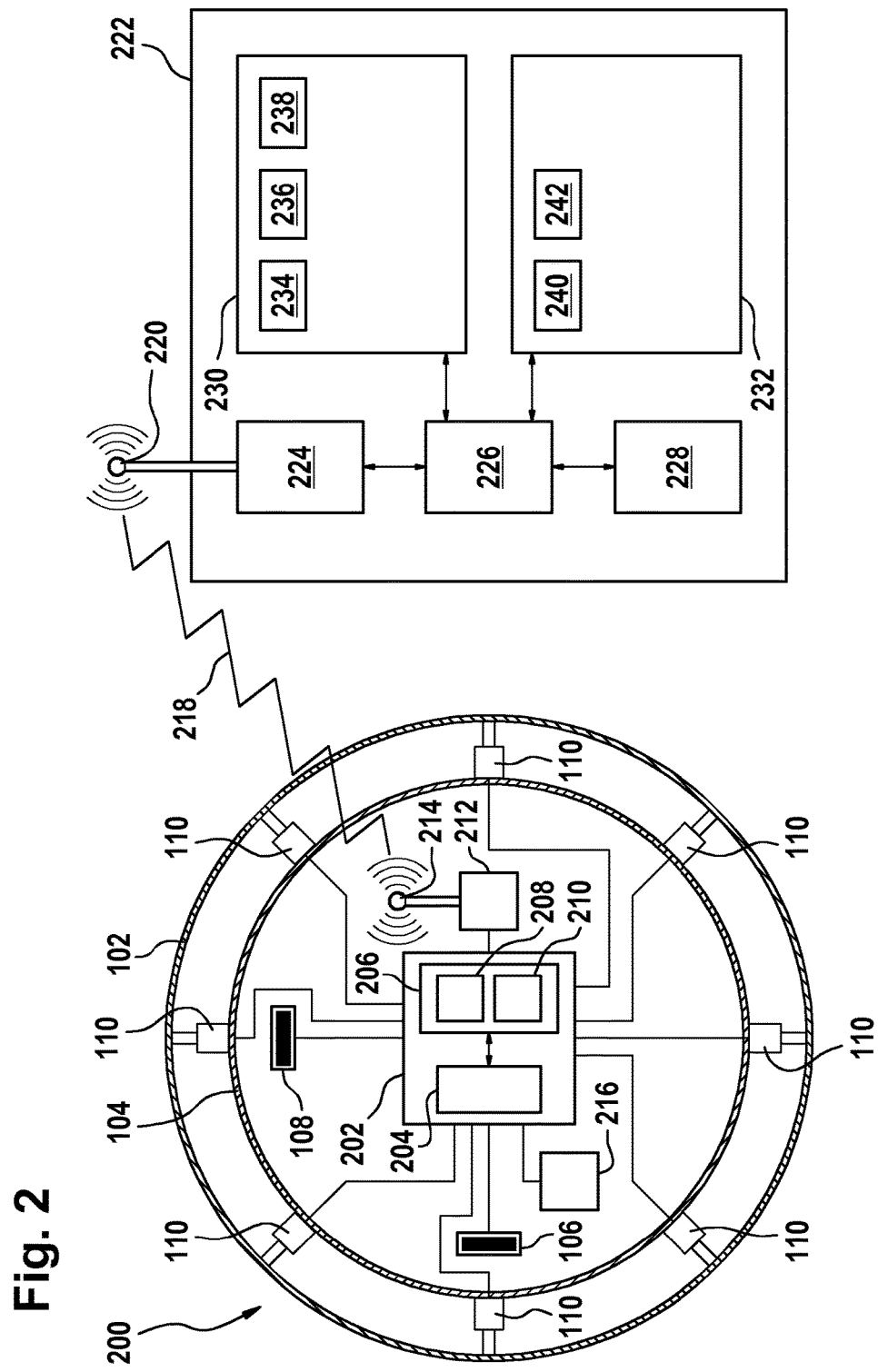
FIG. 2 illustrates a human interface device according to a further embodiment of the invention.

FIG. 2 shows an embodiment of a human interface device according to the invention. The embodiment shown in FIG. 2 is very similar to the embodiment shown in FIG. 1. The embodiment shown in FIG. 2 is shown as containing a microcontroller 202. The microcontroller is connected to the first 106 and the second 108 three-axis-accelerometers. The microcontroller 202 is further connected to the body of pressure sensors 110. The microcontroller 202 is able to measure signals from the accelerometers and the plurality of pressure sensors 110. The microcontroller 202 is shown as further containing a processor 204 and a memory 206.

Within the memory there is a control module. The control module 208 contains machine executable instructions that allow the microcontroller 202 to control the operation and function of the human interface device 200. In some embodiments the control module 208 may contain machine executable instructions for interpreting the data from the accelerometers 106, 108 and the plurality of pressure sensors 110. In this case there is a gesture library 210 that is also stored within the memory 206.

The microcontroller 202 is shown as further being connected to radio communication hardware 212. The radio communication hardware 212 may be any radio communication system that would allow communication with an external computer system 222. For instance the radio communication hardware 212 could be Wi-Fi equipment or in some embodiments it may be a Bluetooth system. Connected to the radio communication hardware 212 is an antenna 214. The microcontroller 202 is also shown as being connected to a power system 216. The power system may contain a battery for powering the operation and function of the human interface device. In some embodiments the power system 216 may also contain an inductive charging system for charging the battery. If there is an inductive charging system included there may be a separate antenna used for charging the battery or in some embodiments the antenna 214 or a portion of the antenna may also be used for charging the battery.

There is a radio communication link 218 shown as establishing communications between the antenna 214 of the human interface device 200 and an antenna 220 of a computer system 222. The computer system 222 is shown as having a radio communication hardware 224 which is able to establish communications with the radio communication hardware 212 of the human interface device 200. The radio communication hardware 224 is shown as being connected to a processor 226 of the computer system 222. The processor 226 is also shown as being connected to a user interface 228 and computer storage 230 and computer memory 232.

The computer storage is shown as containing time-dependent pressure sensor data 234 and time-dependent accelerometer data 236 which were received via the radio communication link 218 from the human interface device 200. The computer storage 230 is also shown as containing a gesture library 238. The gesture library 238 may be the same equivalent to the gesture library 210. Within the computer memory 232 there is a control module 240. The control module 240 contains machine executable instructions for interpreting the time-dependent pressure sensor data 234 and/or the time-dependent accelerometer data 236.

In some embodiments the pressure sensor data 234 and the accelerometer data 236 are received and the control module 240 uses the gesture library 238 to determine a control gesture 242. The control gesture 242 is shown as being stored within the computer memory 232. In other embodiments only the control gesture 242 is sent to the computer system 222. In other words the control gesture 242 may be determined by the processor 204 of the microcontroller 202 or by the processor 226 of the computer system 222. In the case where the control gesture 242 is determined by the processor 226 of the computer system 222 the processor of the computer system 222 may be considered to be part of the human interface device 200.

Figure 3:
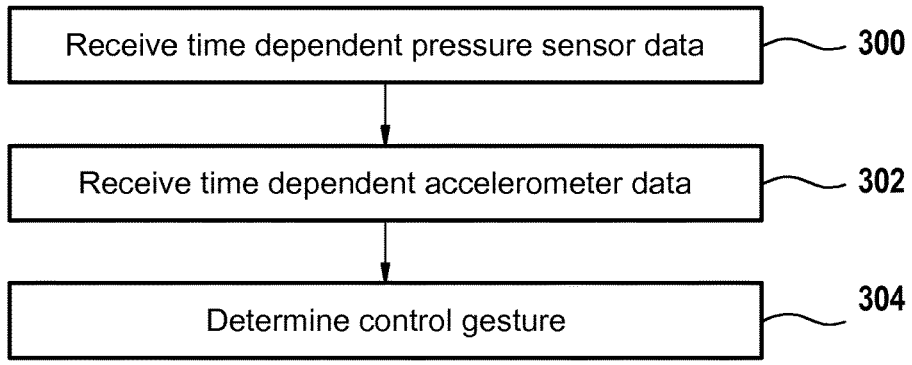
FIG. 3 shows a flow diagram which illustrates a method according to an embodiment of the invention.

FIG. 3 shows a flow diagram that illustrates a method according to an embodiment of the invention. In step 300 time-dependent pressure sensor data is received. In step 302 time-dependent accelerometer data is received. In step 304 the control gesture is determined using the time-dependent pressure sensor data and the time-dependent accelerometer data.

Figure 4:
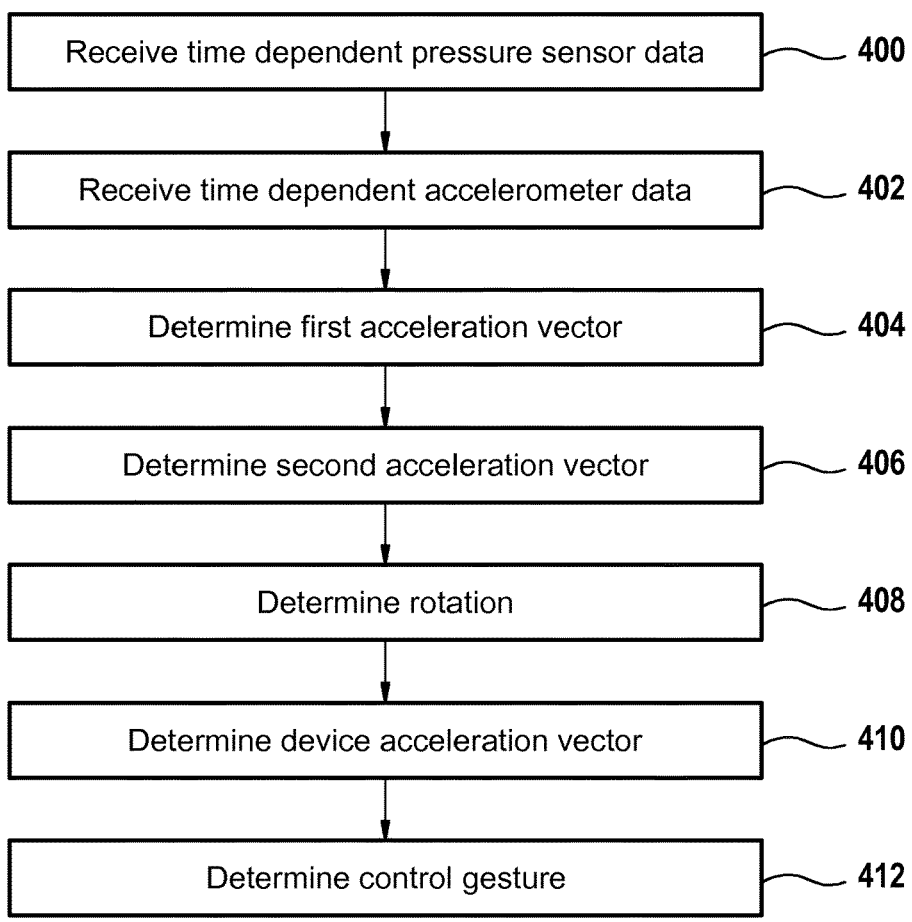
FIG. 4 shows a flow diagram which illustrates a method according to a further embodiment of the invention.

FIG. 4 shows a flow diagram that illustrates a further embodiment of the invention. In step 400 time-dependent pressure sensor data is received. In step 402 time-dependent accelerometer data is received. In step 404 a first acceleration vector is determined. In step 406 a second acceleration vector is determined. In step 408 the rotation is determined using the first acceleration vector and the second acceleration vector. In step 410 a device acceleration vector is determined.

The device acceleration vector is determined using the first acceleration vector and the second acceleration vector. The device acceleration vector is the acceleration of the human interface device and does not include the rotational component. Finally in step 412 the control gesture is determined using the rotation and the device acceleration vector. In some instances the control gesture may be determined on the basis of how the rotation and the device acceleration vector are changing as a function of time.

Figure 5:
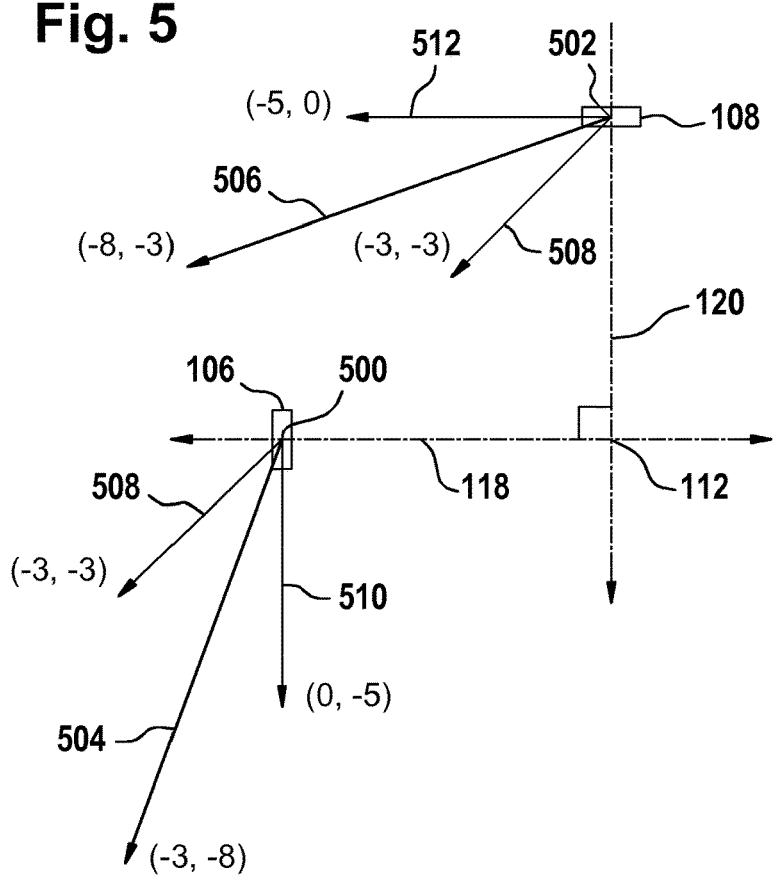
FIG. 5 illustrates acceleration vectors measured by the first and the second three-axis-accelerometers.

FIG. 5 shows the first 106 and the second 108 three-axis-accelerometers. Within the first accelerometer 106 the first acceleration center 500 is visible. Within the second accelerometer 108 the second accelerometer center 502 is visible. Each accelerometer 106, 108 measures an acceleration vector. The first accelerometer 106 measures the first acceleration vector 504 and a second accelerometer 108 measures the second acceleration vector 506. Each acceleration vector 504, 506 has several components. There is a device acceleration vector 508. The device acceleration vector as measured by both accelerometers 106, 108 are identical.

There is also a force component due to the change in the rotational velocity of the human interface device. The rotational vector for the first accelerometer is labeled 510 and the rotational vector for the second accelerometer 108 is labeled 512. It is assumed that the accelerometer is at rest rotationally or near at rest so that the centripetal force is neglected. The three-axis accelerometers can measure a torque applied to the human interface device, this is equivalent to knowing the change in rotation of the human interface device. Knowing the change in the rotational rate allows the centripetal force on the three-axis accelerometers to be calculated. The centripetal force can then be subtracted from the measured acceleration vectors. This enables the human interface device to determine the change in rotation when the human interface device is already rotating.

The example shown in FIG. 5 is a two-dimensional simplification of the three-dimensional problem. Near the tip of each vector is labeled the coordinates of the vector. It can be seen by examining vectors 504 and 506 that the vector 508 can be determined by determining a leverage common vector component of the first acceleration vector 504 and the second acceleration vector 506. For instance the vector 504 has coordinates −3, −8 and the vector 506 has the coordinates (−8, −3). The vector 508 can be determined from this to be (−3, −3). A set of equations can be set up, and the vector 508 can be solved for by solving the system of equations.

Figure 6:
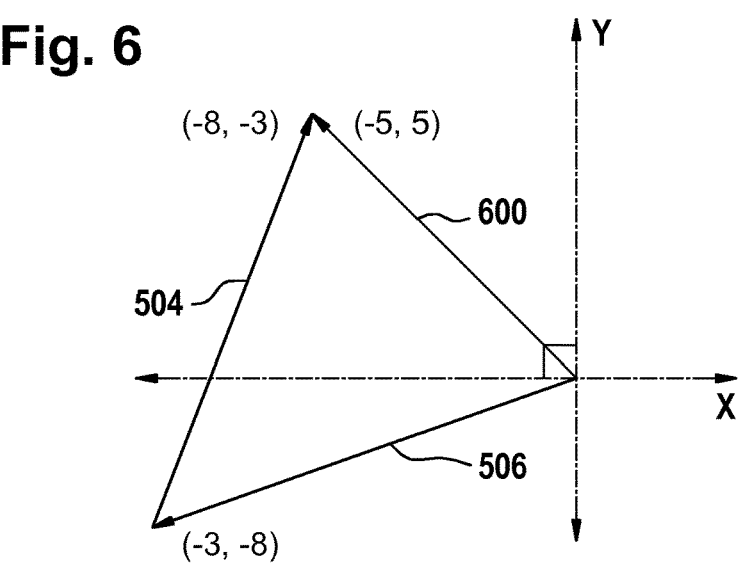
FIG. 6 illustrates a method of determining the rotation of the human interface device.

FIG. 6 illustrates a method of determining the rotation of the human interface device. In this case the first acceleration vector 504 and the second acceleration vector 506 are subtracted from each other. This results in the vector 600. This can be shown to be the length of vector 510 or vector 512 multiplied by the factor of the square root of 2. The vector 600 can be used directly as a measure of the rotation. If the magnitude is desired it can be divided by the square root of 2.

Figure 7:
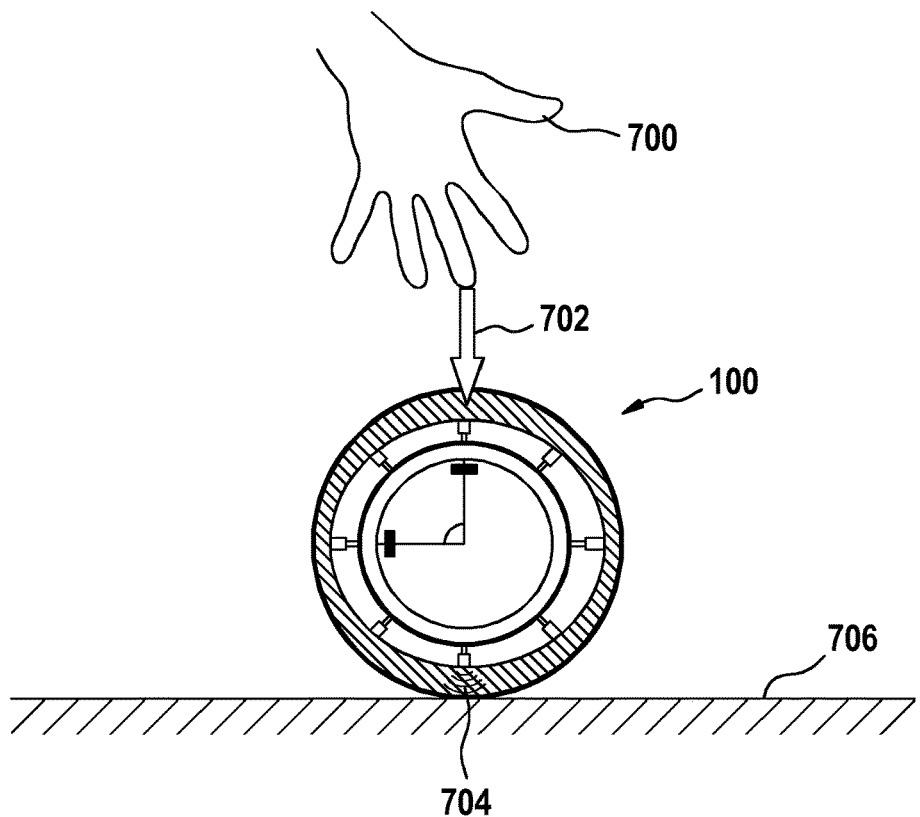
FIG. 7 illustrates a use of a human interface device according to an embodiment of the invention.

FIG. 7 shows an operator 700 operating a human interface device 100. In this case the operator 700 has dropped 702 the human interface device 100. It accelerates in the direction 702 and pressure sensor 704 is depressed when the human interface device 100 hits the floor 706.

Figure 8:
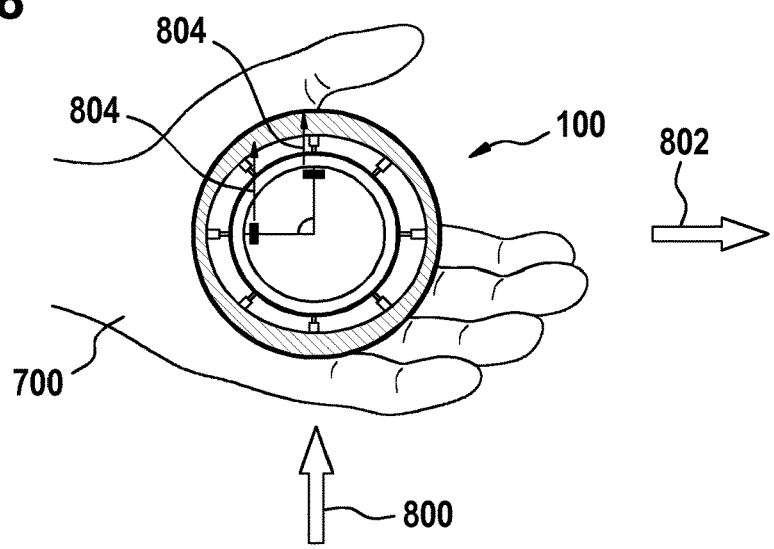
FIG. 8 illustrates a further use of a human interface device according to an embodiment of the invention.

FIG. 8 shows a further motion of the human interface device 100. In this case the operator 700 first moves the human interface device 100 in the direction indicated by the arrow 800. Next the human interface device is moved in the direction indicated by the arrow 802. This indicates a dragging motion of the human interface device 100 that can be interpreted as a gesture. Dragging 800, 802 causes the accelerometers to measure the force vectors 804.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "including" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

It is to be recognized that the embodiments described above are only illustrative, not limitative. For example, as mentioned above, for a command which is not to be executed in real time, it is checked whether an execution result thereof has existed, and if the execution result thereof has existed, the execution result is sent directly to the management platform without executing the command once more. This can decrease the number of executed commands and reduce the workload of the cloud environment. However, in order to reduce the workload of the command analyzer 401, this checking may be not performed, and instead, all commands which are not to be executed in real time are subjected to the packaging processing, and then are sent to the remote machine 601 for execution.

Although the exemplary embodiments of the present invention have been shown and described, it is to be understood by those skilled in the art that various changes in form and details can be made thereto without departing from the scope and spirit of the present invention as defined in the following claims and equivalents thereof.

We claim:

1. An apparatus comprising:
an inner sphere, wherein the inner sphere has a center point;
an outer sphere, wherein the outer sphere is compressible;
a plurality of pressure sensors in contact with both the inner sphere and the outer sphere for detecting localized compression of the outer sphere and generating time dependent pressure sensor data;
a first three-axis-accelerometer located within the inner sphere to generate first time dependent accelerometer data;
a second three-axis-accelerometer located within the inner sphere to generate second time dependent accelerometer data, wherein the first three-axis-accelerometer and the second three-axis-accelerometer-accelerometer are each located at least a predetermined distance from the center point, and a first axis passing through an accelerometer center of the first three-axis-accelerometer and the center point is orthogonal to a second axis passing through an accelerometer center of the second three-axis accelerometer and the center point;
a memory for storing machine executable instructions; and
a processor for executing the machine executable instructions, wherein execution of the instructions causes the processor to:
receive the time dependent pressure sensor data, the first time dependent accelerometer data, and the second time dependent accelerometer data;
determine a control gesture in accordance with the time dependent pressure sensor data, the first time dependent accelerometer data, and the second time dependent accelerometer data;
determine a rotation of the apparatus using the first time dependent accelerometer data and the second time dependent accelerometer data, wherein the control gesture is at least partially determined by the rotation of the apparatus;
determine a first acceleration vector in accordance with the first time dependent accelerometer data measured by the first three-axis-accelerometer;
determine a second acceleration vector in accordance with the second time dependent accelerometer data measured by the second three-axis-accelerometer;
determine the rotation, wherein the rotation is determined at least partially by subtracting the first acceleration vector from the second acceleration vector;
determine if the magnitude of one of the first acceleration vector or the second acceleration vector is below a predetermined threshold;
determine the rotation using the magnitude of the other of the first acceleration vector or the second acceleration vector if the magnitude of the one is below the predetermined threshold; and
determine a change in rotation of the apparatus during rotation of the apparatus by subtracting a measured centripetal force from the measured first acceleration vector and the measured the second acceleration vector.

2. The apparatus of claim 1, wherein the rotation is determined as a function of time, and wherein the control gesture is at least partially determined by the rotation of the apparatus as a function of time.

3. The apparatus of claim 1, wherein execution of the instructions causes the processor to detect a pattern in accordance with the time dependent pressure sensor data, wherein the control gesture is at least partially determined by the pattern.

4. The apparatus of claim 1, wherein execution of the instructions further causes the processor to determine the acceleration of the apparatus using the time dependent accelerometer data, wherein the control gesture is at least partially determined by the acceleration of the apparatus.

5. The apparatus of claim 4, wherein execution of the instructions further causes the processor to:
determine a device acceleration vector, wherein the device acceleration vector is determined by constructing a vector from the largest common vector components of the first acceleration vector and the second acceleration vector.

6. The apparatus of claim 4, wherein the acceleration is determined as a function of time, and wherein the control gesture is at least partially determined by the acceleration of the apparatus as a function of time.

7. The apparatus of claim 1, further comprising a wireless communication system for transmitting any one of the following to a computer system: the time dependent pressure sensor data, the time dependent accelerometer data, the control gesture, or combinations thereof.

8. The apparatus of claim 1, further comprising a battery for powering the apparatus, and an inductive charging system for charging the battery using an inductive charger.

9. The apparatus of claim 1, wherein the first three-axis-accelerometer and the second three-axis-accelerometer are located a same distance from the center point.

10. A computer program apparatus comprising:
a computer readable storage medium; and
computer usable code stored on the computer readable storage medium, where, if executed by a processor, the computer usable code causes a computer to:
receive time dependent pressure sensor data from a plurality of pressure sensors distributed between and in contact with both an inner sphere and the outer sphere of a human interface device, for detecting localized compression of the outer sphere, wherein the inner sphere has a center point;
receive time dependent accelerometer data from a first three-axis-accelerometer and a second three-axis-accelerometer located within the inner sphere at least at a predetermined distance from the center point, wherein a first axis passing through an accelerometer center of the first three-axis-accelerometer and the center point is orthogonal to a second axis passing through an accelerometer center of the second three-axis accelerometer and the center point;
determine a control gesture in accordance with the time dependent pressure sensor data and the time dependent accelerometer data;
determine a rotation of a human interface device using the time dependent accelerometer data, wherein the control gesture is at least partially determined by the rotation of the human interface device;
determine a first acceleration vector in accordance with the time dependent accelerometer data, wherein the first acceleration vector represents the acceleration measured by the first three-axis-accelerometer,
determine a second acceleration vector in accordance with the time dependent accelerometer data, wherein the second acceleration vector represents the acceleration measured by the second three-axis-accelerometer, determine the rotation, wherein the rotation is determined at least partially by subtracting the first acceleration vector from the second acceleration vector;

determine if the magnitude of one of the first acceleration vector or the second acceleration vector is below a predetermined threshold, determine the rotation using the magnitude of the other of the first acceleration vector or the second acceleration vector if the magnitude of the one is below the predetermined threshold; and determine a change in rotation of the apparatus during rotation of the apparatus by subtracting a measured centripetal force from the measured first acceleration vector and the measured the second acceleration vector.

11. The computer program apparatus of claim 10, wherein the first three-axis-accelerometer and the second three-axis-accelerometer are located a same distance from the center point.

* * * * *